(12) United States Patent
Peet et al.

(10) Patent No.: US 11,020,946 B2
(45) Date of Patent: Jun. 1, 2021

(54) BUILDING BOARD HAVING HIGH FASTENER SEALABILITY

(71) Applicant: CERTAINTEED GYPSUM, INC., Malvern, PA (US)

(72) Inventors: Jeffrey H. Peet, Southborough, MA (US); Artemis Agelaridou-Twohig, Marlboro, MA (US); Michael J. Lemberger, Dudley, MA (US); Todd P. DiNoia, Littleton, MA (US); Jean-Philippe Ndobo-Epoy, Westboro, MA (US)

(73) Assignee: CERTAINTEED GYPSUM, INC., Malvern, PA (US)

( * ) Notice: Subject to any disclaimer, the term of this patent is extended or adjusted under 35 U.S.C. 154(b) by 4 days.

(21) Appl. No.: 15/476,595

(22) Filed: Mar. 31, 2017

(65) Prior Publication Data
US 2017/0282510 A1 Oct. 5, 2017

Related U.S. Application Data

(60) Provisional application No. 62/339,453, filed on May 20, 2016, provisional application No. 62/316,999, filed on Apr. 1, 2016.

(51) Int. Cl.
*B32B 27/12* (2006.01)
*B32B 3/26* (2006.01)
(Continued)

(52) U.S. Cl.
CPC .............. *B32B 27/12* (2013.01); *B32B 3/266* (2013.01); *B32B 5/022* (2013.01); *B32B 5/024* (2013.01);
(Continued)

(58) Field of Classification Search
CPC ......... B32B 13/00; B32B 13/02; B32B 13/04; B32B 13/12; B32B 13/14; B32B 2607/00;
(Continued)

(56) References Cited

U.S. PATENT DOCUMENTS 3,967,016 A  6/1976  Schneller et al.
4,106,588 A  8/1978  Moore et al.
(Continued)

FOREIGN PATENT DOCUMENTS

JP  H08300550 A  11/1996
JP  H11315595 A  11/1999
WO  2014143780 A1  9/2014

OTHER PUBLICATIONS

Selke, Susan E. M. Culter, John D.. (2016). Plastics Packaging—Properties, Processing, Applications, and Regulations (3rd Edition). 4.9.1. Polyethylene Terephthalate (PET). Hanser Publishers. Retrieved from app.knovel.com/hotlink/toc/id:kpPPPPARE1/plastics-packaging-properties/plastics-packaging-properties.*
(Continued)

*Primary Examiner* — Maria V Ewald
*Assistant Examiner* — Ethan A. Utt
(74) *Attorney, Agent, or Firm* — Abel Schillinger, LLP; Thomas H. Osborn

(57) ABSTRACT

A building board, particularly a gypsum board, can have a high fastener sealability if protected by the combination of thin layers of an extruded polymer film and a thermoplastic coating layer. The combination of extruded polymer film and thermoplastic coating layer is designed such that the gypsum board can also tolerate overdriven fasteners, thus exceeding the requirements of ASTM D1970-15.

15 Claims, 3 Drawing Sheets

(51) Int. Cl.
    *B32B 5/02*         (2006.01)
    *B32B 13/14*        (2006.01)
    *E04C 2/04*         (2006.01)
    *E04C 2/26*         (2006.01)
    *B32B 27/32*        (2006.01)
    *B32B 19/04*        (2006.01)
    *B32B 27/34*        (2006.01)
    *B32B 13/12*        (2006.01)
    *B32B 7/12*         (2006.01)
    *B32B 13/04*        (2006.01)
    *B32B 27/06*        (2006.01)
    *B32B 27/36*        (2006.01)
    *B32B 37/12*        (2006.01)
    *B32B 37/15*        (2006.01)
    *B32B 13/02*        (2006.01)
    *B32B 27/28*        (2006.01)
    *E04C 2/52*         (2006.01)
    *B32B 37/24*        (2006.01)
    *B32B 38/00*        (2006.01)
    *B32B 37/02*        (2006.01)
(52) U.S. Cl.
    CPC ................ *B32B 7/12* (2013.01); *B32B 13/02* (2013.01); *B32B 13/04* (2013.01); *B32B 13/12* (2013.01); *B32B 13/14* (2013.01); *B32B 19/045* (2013.01); *B32B 27/06* (2013.01); *B32B 27/281* (2013.01); *B32B 27/32* (2013.01); *B32B 27/34* (2013.01); *B32B 27/36* (2013.01); *B32B 37/12* (2013.01); *B32B 37/153* (2013.01); *B32B 37/24* (2013.01); *B32B 38/164* (2013.01); *E04C 2/043* (2013.01); *E04C 2/26* (2013.01); *E04C 2/528* (2013.01); *B32B 37/02* (2013.01); *B32B 2250/04* (2013.01); *B32B 2250/05* (2013.01); *B32B 2250/40* (2013.01); *B32B 2255/10* (2013.01); *B32B 2255/26* (2013.01); *B32B 2255/28* (2013.01); *B32B 2260/021* (2013.01); *B32B 2260/044* (2013.01); *B32B 2262/0276* (2013.01); *B32B 2262/10* (2013.01); *B32B 2262/101* (2013.01); *B32B 2262/14* (2013.01); *B32B 2307/50* (2013.01); *B32B 2307/51* (2013.01); *B32B 2307/536* (2013.01); *B32B 2307/54* (2013.01); *B32B 2307/7246* (2013.01); *B32B 2307/732* (2013.01); *B32B 2315/085* (2013.01); *B32B 2315/18* (2013.01); *B32B 2419/00* (2013.01); *B32B 2607/00* (2013.01)

(58) Field of Classification Search
    CPC ......... B32B 17/00; B32B 17/02; B32B 17/04; B32B 17/06; B32B 17/064; B32B 17/10; B32B 27/00; B32B 27/06; B32B 27/08; B32B 27/12; B32B 27/28; B32B 27/281; B32B 27/30; B32B 27/302; B32B 27/306; B32B 27/308; B32B 27/32; B32B 27/34; B32B 27/36; B32B 27/40; B32B 7/00; B32B 7/04; B32B 7/12; B32B 7/14; B32B 27/04; B32B 27/10; B32B 2255/00; B32B 2255/02; B32B 2255/12; B32B 2255/26; B32B 2255/28; B32B 29/00; B32B 29/002; B32B 29/005; B32B 29/02; B32B 5/00; B32B 5/02; B32B 5/022; B32B 5/024; B32B 5/22; B32B 5/24; B32B 5/245; B32B 5/26; B32B 5/28; B32B 27/327; E04C 2/00; E04C 2/02; E04C 2/04; E04C 2/043; E04C 2/049; E04C 2/10; E04C 2/16; E04C 2/20; E04C 2/24; E04C 2/26; E04C 2/06; E04C 2/44; E04C 2/46; Y10T 428/31551; Y10T 428/31562; Y10T 428/31565; Y10T 428/31616; Y10T 428/31623; Y10T 428/31645; Y10T 428/31721; Y10T 428/31725; Y10T 428/31728; Y10T 428/31732; Y10T 428/31754; Y10T 428/31757; Y10T 428/31765; Y10T 428/31768; Y10T 428/31786; Y10T 428/31797; Y10T 428/31855; Y10T 428/21909; Y10T 428/31913; Y10T 428/31573; Y10T 428/31587; Y10T 428/31598; Y10T 428/31601; Y10T 428/31649; Y10T 428/31736; Y10T 428/31739; Y10T 428/31743; Y10T 428/31746; Y10T 428/3175; Y10T 428/91928; Y10T 428/31935; Y10T 428/31938; Y10T 428/31504; Y10T 428/31554; Y10T 428/31576; Y10T 428/31779; Y10T 428/3178; Y10T 428/3179; Y10T 428/31794; Y10T 428/3188; Y10T 428/31884; Y10T 428/31888; Y10T 428/31891; Y10T 428/31895; Y10T 428/31899; Y10T 428/31902; Y10T 428/31906; Y10T 428/31909; Y10T 428/31917; Y10T 428/31924; Y10T 428/31928; Y10T 428/31931; Y10T 428/28; Y10T 428/2809; Y10T 428/2813; Y10T 428/2817; Y10T 428/2822; Y10T 428/2826; Y10T 428/283; Y10T 428/2835; Y10T 428/2839; Y10T 428/2843; Y10T 428/2848; Y10T 428/2852; Y10T 428/287; Y10T 428/2874; Y10T 428/2878; Y10T 428/2883; Y10T 428/2887; Y10T 428/2891; Y10T 428/2896; Y10T 442/2164; Y10T 442/2172; Y10T 442/218; Y10T 442/2189; Y10T 442/2197; Y10T 442/2205; Y10T 442/2213; Y10T 442/2221; Y10T 442/223; Y10T 442/2238; Y10T 442/2246; Y10T 442/2254; Y10T 442/30; Y10T 442/3854; Y10T 442/3862; Y10T 442/387; Y10T 442/3886; Y10T 442/3894; Y10T 442/3902; Y10T 442/3878; Y10T 442/3911; Y10T 442/3919; Y10T 442/2861; Y10T 442/2869; Y10T 442/2877; Y10T 442/2885; Y10T 442/2893; Y10T 442/2902; Y10T 442/291; Y10T 442/2918; Y10T 442/2926; Y10T 442/2934; Y10T 442/2943; Y10T 442/2951; Y10T 442/2959; Y10T 442/2967; Y10T 442/2975; Y10T 442/2984; Y10T 442/2992; Y10T 442/674; Y10T 442/675; Y10T 442/676; Y10T 442/677; Y10T 442/678; Y10T 442/679; Y10T 442/68; Y10T 428/31609; Y10T 428/31971; Y10T 428/31975; Y10T 428/31978; Y10T 428/31982; Y10T 428/31986; Y10T 428/31993; Y10T 428/31996; Y10T 442/10; Y10T 442/102; Y10T 442/133; Y10T 442/145; Y10T 442/164; Y10T 442/169; Y10T 442/171; Y10T 442/172; Y10T 442/176; Y10T 442/184; Y10T 442/191; Y10T 442/198; Y10T 442/20; Y10T 442/2025; Y10T 442/2041; Y10T 442/2098; Y10T 442/2139; Y10T 442/60; Y10T 428/24942; Y10T 428/2495; Y10T 428/24959; Y10T 428/24967; Y10T 428/24975; Y10T 428/24983; Y10T 428/24992; Y10T 428/26; Y10T 428/261; Y10T 428/263; Y10T 428/264; Y10T 428/265; Y10T 428/266; Y10T 428/268; Y10T 428/269; Y10T 428/27; Y10T 428/273; Y10T 428/277; Y10T 428/31761; Y10T 428/31772; Y10T 428/31775; Y10T 428/31783; Y10T 428/31591; D03D 15/00; D03D 15/0011; D06M 15/00; D06M 15/19; D06M 15/21; D06M 15/227; D06M 15/233; D06M 15/263; D06M 15/285; D06M 15/327; D06M 15/333; D06M 15/37; D06M 15/507; D06M 15/564; D06M 15/568; D06M 15/572; D06M 15/59; D06M 15/592; D06M 2200/00; D06M 2200/10; D06M 2200/12; D04H 3/00; D04H 3/002; D04H 3/004; E04B 1/00; E04B 1/02; E04B 1/12; E04B 1/14; E04B 1/62; E04B 1/66; E04B 1/92

USPC ...... 428/688, 689, 697, 423.1, 423.5, 423.7, 428/424.2, 424.8, 426, 430, 435, 441, 428/442, 473.5, 474.4, 474.7, 474.9, 428/475.2, 475.5, 476.6, 476.9, 477.7, 428/478.2, 500, 425.5, 425.6, 475.8, 428/476.1, 476.3, 699–703, 411.1, 423.3, 428/424.4, 479.3, 479.6, 480–483, 428/507–517, 519–523, 343, 345–354, 428/355, 355 R, 355 EP, 355 AK, 428/355 EN, 355 BL, 355 CN, 355 AC, 428/355 N, 515, 516, 520, 522, 532–536, 428/537.5, 537.7, 212–220, 332–342, 428/480–483; 442/79–90, 152–180, 442/286–294, 394–399, 1, 2, 20, 27, 38, 442/41, 42, 43, 45, 50, 54, 58, 59, 62, 64, 442/71, 76, 181, 327; 162/135–137, 152, 162/156, 157.1–157.7, 231; 52/309, 52/309.1, 309.3, 309.13–309.17, 506.01, 52/512, 782.1, 783.1, 791.1, 793.1, 52/793.11, 794.1

See application file for complete search history.

(56) References Cited

U.S. PATENT DOCUMENTS

| | | | |
|---|---|---|---|
| 4,328,652 A | 5/1982 | Naumovich, Jr. | |
| 4,811,538 A | 3/1989 | Lehnert et al. | |
| 5,316,848 A | 5/1994 | Bartlett et al. | |
| 5,871,857 A | 2/1999 | Alhamad | |
| 6,054,088 A | 4/2000 | Alhamad | |
| 6,334,280 B1 | 1/2002 | Frappart et al. | |
| 6,524,679 B2 | 2/2003 | Hauber et al. | |
| 6,531,210 B1 | 3/2003 | Englert | |
| 6,770,354 B2* | 8/2004 | Randall | E04C 2/043 428/219 |
| 6,800,361 B2 | 10/2004 | Bruce et al. | |
| 6,925,766 B2 | 8/2005 | Di Pede | |
| 6,941,720 B2 | 9/2005 | Deford et al. | |
| 6,983,821 B2 | 1/2006 | Putt et al. | |
| 7,594,456 B2 | 9/2009 | Hauber et al. | |
| 7,763,134 B1* | 7/2010 | Kumar | B32B 13/12 156/39 |
| 7,807,592 B2 | 10/2010 | Bland et al. | |
| 7,908,810 B2 | 3/2011 | Payne, Jr. et al. | |
| 8,070,895 B2 | 12/2011 | Engbrecht et al. | |
| 8,309,211 B2 | 11/2012 | Mehta et al. | |
| 8,323,770 B2 | 12/2012 | Mehta et al. | |
| 8,353,401 B2 | 1/2013 | Hauber et al. | |
| 8,486,516 B2 | 7/2013 | Hauber et al. | |
| 8,557,366 B2 | 10/2013 | Harrington, Jr. et al. | |
| 8,568,544 B2 | 10/2013 | Engbrecht et al. | |
| 8,832,923 B2 | 9/2014 | Hauber et al. | |
| 9,068,586 B2 | 6/2015 | Hauber et al. | |
| 9,834,929 B2* | 12/2017 | Boydston | B32B 27/00 |
| 2002/0151240 A1 | 10/2002 | Smith et al. | |
| 2002/0187297 A1 | 12/2002 | Hauber et al. | |
| 2003/0194584 A1* | 10/2003 | Clausen | E04C 2/043 428/532 |
| 2004/0142618 A1 | 7/2004 | Porter | |
| 2005/0097857 A1 | 5/2005 | Mehta et al. | |
| 2005/0130541 A1 | 6/2005 | Shah | |
| 2007/0015424 A1* | 1/2007 | Toas | B32B 27/06 442/59 |
| 2007/0110980 A1 | 5/2007 | Shah | |
| 2010/0055431 A1* | 3/2010 | College | B32B 13/14 428/411.1 |
| 2010/0178827 A1 | 7/2010 | Thai et al. | |
| 2010/0247937 A1 | 9/2010 | Liu | |
| 2010/0316808 A1* | 12/2010 | Hall | C09D 123/10 427/398.1 |
| 2011/0083396 A1 | 4/2011 | Shelton et al. | |
| 2011/0165394 A1 | 7/2011 | Hirose et al. | |
| 2011/0173910 A1* | 7/2011 | Franklin | B32B 7/12 52/309.1 |
| 2011/0256372 A1 | 10/2011 | Hauber et al. | |
| 2011/0257301 A1 | 10/2011 | Stuart et al. | |
| 2013/0178126 A1 | 7/2013 | Bennett | |
| 2014/0272404 A1 | 9/2014 | Shake et al. | |
| 2015/0064488 A1 | 3/2015 | Foster et al. | |
| 2015/0197938 A1 | 7/2015 | Boydston et al. | |

OTHER PUBLICATIONS

International Search Report for PCT/US2017/025540, dated Aug. 18, 2017, 1 page.

International Search Report for PCT/US2017/025607, dated Aug. 18, 2017, 1 page.

ASTM International "StandardSpecification for Self-Adhering Polymer Modified Bituminous Sheet Materials Used as Steep Roofing Underlayment for Ice Dam Protection", 2015, 6 pgs.

ASTM International "Standard Test Method for Determining the Capability of Roofing and Waterproofing Materials to Seal around Fasteners", 2015, 5 pgs.

DeMeuse, Mark T. (2011). Biaxial Stretching of Film—Principles and Applications—1. Fundamentals of Biaxial Stretching and Definitions of Terms. Woodhead Publishing. Retrieved from app.knovel.com/hotlinkpdf/id:kt0094H3A1/biaxial-stretching-film/ fundamentals-biaxial.

* cited by examiner

BUILDING BOARD HAVING HIGH FASTENER SEALABILITY

CROSS-REFERENCE TO RELATED APPLICATION(S)

This application claims priority under 35 U.S.C. § 119(e) to U.S. Provisional Patent Application No. 62/339,453, entitled "BUILDING BOARD FOR EXTERNAL USE WITH HIGH FASTENER SEALABILITY," by Jeffrey H. PEET et al., filed May 20, 2016, and also claims priority under 35 U.S.C. § 119(e) to U.S. Provisional Patent Application No. 62/316,999, entitled "GYPSUM WALL BOARD WITH HIGH WATER RESISTANCE COMPRISING A LAMINATE," by Choung-Houng L A I et al., filed Apr. 1, 2016, which are assigned to the current assignee hereof and incorporated herein by reference in their entireties.

FIELD OF THE DISCLOSURE

The present disclosure relates to a building board having high fastener sealability.

BACKGROUND

Building board, also known as wallboard, plasterboard, or drywall, is one of the most commonly used building components in the world. Building board is frequently used within the interior of a dwelling, where it functions both as a finished wall covering and as a structural room partition. Building board can also be used on the exterior of a dwelling, where it serves as a sheathing to provide weather protection and insulation. Building board can also be used as an interior facing for other structures as well, such as stairwells, elevator shafts, and interior ducting.

One particularly popular form of building board is known as gypsum board. Gypsum board is constructed by depositing a layer of cementitious gypsum slurry that may contain certain fillers and polymeric additives between two opposing liners, which can be paper, glass fiber mats, or paper supported by glass fiber mats, whereby the glass fiber mats can be partly embedded into the gypsum core.

Most gypsum boards are designed for interior use, since the gypsum core is difficult to protect against excessive exposure to water. The exposure to water is an even larger problem when fasteners, such as nails or screws, are used for installing the gypsum boards. An overdriven screw can easily damage an exterior board coating, thereby allowing water to penetrate into the gypsum core and successively to weaken and to damage the gypsum board.

There exists a need in the art for improved building board composites, particularly gypsum board composites. More specifically, there is a need in the art for cost-effective building boards for external use which provide enhanced durability, impact resistance, fastener sealability and water repellency.

SUMMARY

According to one embodiment, a building board comprises: a cementitious layer sandwiched between a first fiber mat and a second fiber mat; an extruded polymer film overlying the first fiber mat and/or the second fiber mat, the extruded polymer film having a thickness in a range of at least 5 microns (0.2 mil) and not greater than 130 microns (5.1 mil); and a thermoplastic coating layer directly overlying the extruded polymer film, the thermoplastic coating layer having a thickness in a range of at least 30 microns (1.2 mil) and not greater than 260 microns (10.2 mil), wherein the building board passes fastener sealability testing according to a modified ASTM D1970-15, the fastener sealability testing employing a fastener being 635 microns (20 mil) overdriven in the building board for a period of three days at 22° C.

According to a further embodiment, a method for manufacturing a building board, comprises: providing an extruded polymer film having a thickness in a range of at least 5 microns (0.2 mil) and not greater than 130 microns (5.1 mil) and attaching the polymer film with an adhesive onto a first surface of a first fiber-mat; applying a cementitious layer on top of a second surface of the first fiber-mat, the second surface being opposite to the first surface of the first fiber-mat; applying a second fiber mat on top of the cementitious layer to obtain a fiber-mat sandwiched cementitious layer composite; drying the fiber-mat sandwiched cementitious layer composite; and applying a thermoplastic polymeric coating layer onto an outer surface of the extruded polymer film, wherein the building board passes fastener sealability testing according to a modified ASTM D1970-15, the modified testing comprising employing a fastener being 635 microns (20 mil) overdriven in the building board for a period of 3 days at 22° C.

BRIEF DESCRIPTION OF THE DRAWINGS

The present disclosure may be better understood, and its numerous features and advantages made apparent to those skilled in the art by referencing the accompanying drawings.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Various embodiments of the present disclosure will now be described, by way of example only, with reference to the accompanying drawings.

The present disclosure relates to a building board suitable for exterior use. The building board includes a cementitious core and a multi-layered protective structure adapted to protect the cementitious core. Particularly the composite board can form a strong seal against water between fasteners penetrating the board and the inner cementitious structure of the board.

The building board of the present disclosure may be installed on the exterior side of a wall cavity, and may be further covered by an exterior insulation, a siding, a cladding, or a façade. The building board of the present disclosure can also be suitable for interior use, particularly in wet areas of a building, such as high humidity bathrooms. In embodiments, the building board can be a wallboard, a dry wall, a gypsum board, a gypsum lathe, a gypsum panel or a gypsum sheathing.

As used herein, the term "fastener" is intended to mean nails or screws that are typically used in the field of exterior or interior building construction to install building boards at a desired location.

As used herein, the term "cementitious" is intended to mean behavior and use of a material that reacts with or binds water to a high degree and can form a mortar-like material in the set form.

Figure 1:
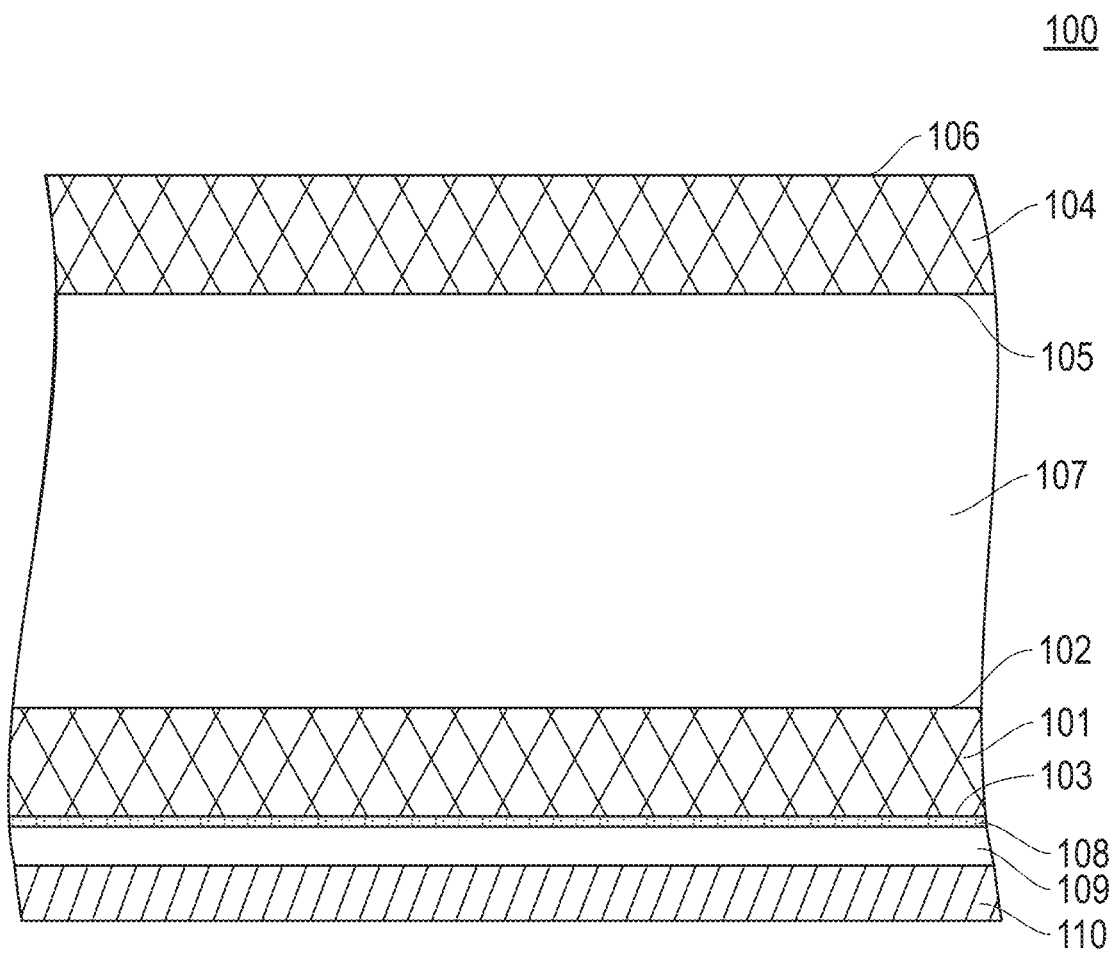
FIG. 1 includes an illustration of a building board composite according to one embodiment.

In one embodiment, as illustrated in FIG. 1, the building board 100 may contain a first fiber-mat 101, having a first surface 102 and a second surface 103, and a second fiber-mat 104 containing a first surface 105 and a second surface 106. Between the first fiber-mat 101 and the second fiber-mat 104 may be positioned a cementitious layer 107. The first fiber mat 101 may further include an adhesive layer 108 on its second surface 103, and a polymer film 109 attached to the adhesive layer 108. Furthermore, the building board can contain a coating layer 110 directly attached to the polymer film 109.

The cementitious layer 107 can include a cementitious material including gypsum, Portland cement, magnesium oxide, magnesium phosphate, or any combination thereof. In a particular embodiment, the cementitious material may be gypsum. The amount of gypsum in layer 107 can comprise at least about 60 wt % of set gypsum, such as at least 65 wt %, at least 70 wt %, at least 75 wt %, at least 80 wt %, at least 85 wt %, at least 90 wt %, at least 95 wt %, or at least 98 wt % of set gypsum based on the total weight of the cementitious layer.

The composition from which the set gypsum core is made can optionally include additional constituents, for example, those included in fire-resistant gypsum board and in water-resistant gypsum board. Examples of such constituents include set accelerators, retarders, starch, foaming agents, dispersing agents, water resistant additives and fire resistant additives.

The first fiber-mat 101 and the second fiber-mat 104 can be of the same material or of different materials. The fiber-mats 101 and 104 can include a woven or non-woven material of organic or inorganic fibers. In one embodiment, the fiber-mats are glass fiber-mats. In another embodiment, the fiber-mats 101 and 104 can be made from polyester. The fiber-mats 101 and 104 can be embedded completely in the cementitious layer 107. In one embodiment, the fiber-mat 104 may be embedded to at least 85% in the gypsum layer 107, such as at least 90%, at least 95%, at least 98%, at least 99%, or at least 99.9% based on the total volume of the fiber-mat.

It has been surprisingly discovered that by attaching a polymer film 109 having certain mechanical properties and a certain thickness to the outer surface of at least one of the fiber-mats 101 and 104, and by further coating the polymer film 109 with a protective thermoplastic coating layer 110 having an optimized water resistance, elasticity, strength, adhesion to fasteners and thickness, building boards can be manufactured with a heightened standard of fastener sealability, such that the gypsum board can also tolerate overdriven fasteners, thus exceeding the requirements of ASTM D1970-15. In one particular aspect, the building board of the present disclosure can be very cost efficient by employing a combination of a thin polymer film and a thin thermoplastic coating layer to obtain a desired fastener sealability.

Figure 2:
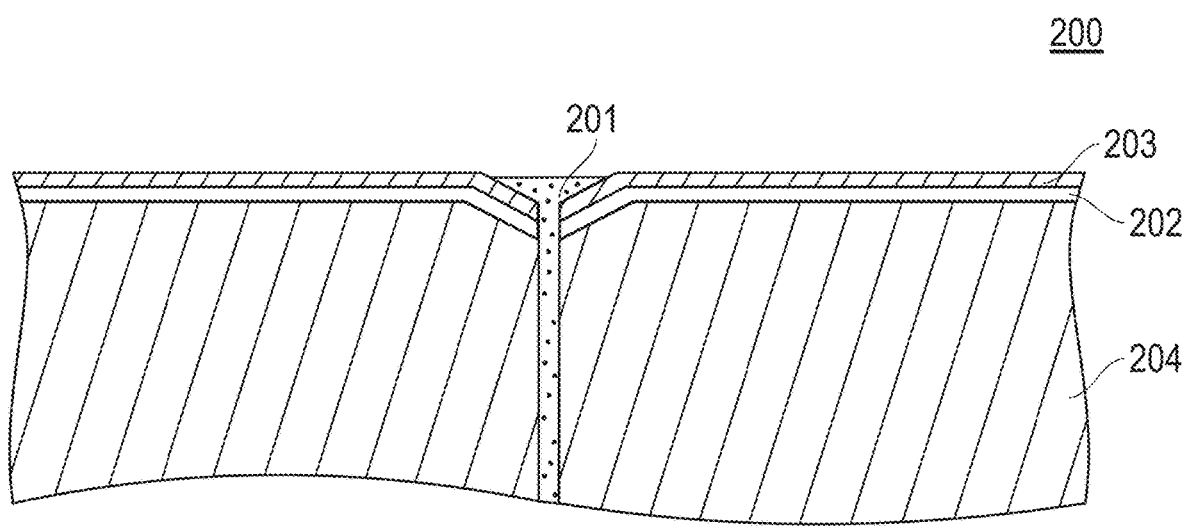
FIG. 2 includes an illustration of an overdriven fastener into a building board according to one embodiment.

FIG. 2 illustrates the entering of an overdriven fastener 201 into a building board 200 according to one embodiment of the present disclosure. The polymer film 202 can mechanically resist the fastener head from entering the cementitious core structure 204, e.g., a set gypsum layer with embedded glass fiber-mats. The coating layer 203 may flexibly adhere to the fastener without breaking or become loosened from the polymer layer 202, and can provide long lasting seal and protection for the building board.

For evaluating the ability of the building board to seal around a fastener, a heightened standard ASTM D1970-15 has been applied. ASTM D1970-15 is particularly designed for testing the sealing of roofing nails in roofing underlinements, but is not well representative for overdriven screws in gypsum boards. The test method used for the boards of the present disclosure is in more detailed described in the experimental section of this disclosure.

Referring again to FIG. 1, in embodiments, the polymer layer 109 can have a thickness Tp and the coating layer 110 can have a thickness Tc, wherein a ratio of Tp to Tc may be not greater than 1:1, such as not greater than 1:2, not greater than 1:3, or not greater than 1:5. In other embodiments, the ratio of Tp to Tc may be at least 1:100, such as at least 1:50, at least 1:30 or at least 1:10. The ratio of Tp to Tc can be a ratio between any of the ratios noted above, such as from 1:1 to 1:100, from 1:1 to 1:50, from 1:1 to 1:20, or from 1:1 to 1:10.

In a particular embodiment, the polymer film 109 of the building board of the present disclosure may be an extruded polymer film. The polymer film 109 can have the function of a mechanical buffer or spacer, preventing an overdriven fastener from damaging the cementitious core of the board.

The polymer film 109 can be a polyester, a polypropylene, a polyamide, a polyimide, or a polyamide imide. In particular embodiments, the polymer film may be a polyester, for example, a polyethylene terephthalate (PET), a polypropylene terephthalate (PPT), a polybutylene terephthalate (PBT), or any combination thereof. In a particular embodiment, the polymer film may be a melt-extruded, bi-axially stretched film consisting essentially of PET.

In embodiments, the polymer film 109 can have a Young's modulus of at least 1500 MPa, such as at least 1800 MPa, or at least 2000 MPa. In other embodiment, the Young's modulus can be not greater than 3500 MPa, such as not greater than 3300 MPa, or not greater than 3000 MPa. The Young's modulus can have a value between any of the maximum and minimum values noted above, such as from 1500 MPa to 3500 MPa, from 2000 MPa to 3000 MPa, or from 2200 MPa to 2800 MPa.

In further embodiments, the polymer film 109 can have a Tensile Strength of at least 30 MPa, such as at least 35 MPa, or at least 40 MPa. In yet other aspects the Tensile Strength may be not greater than 110 MPa, such as not greater than 100 MPa, not greater than 90 MPa, or not greater than 80 MPa. The Tensile Strength can have a value between any of the maximum and minimum values noted above, such as from 30 MPa to 110 MPa, from 35 MPa to 90 MPa, or from 40 MPa to 80 MPa.

In embodiments, the thickness of the polymer film 109 can be at least 5 μm, such at least 10 μm, at least 15 μm, at least 20 µm, at least 30 µm, or at least 50 µm. In other embodiments, the thickness of the polymer film may be not greater than 700 µm, such as not greater than 650 µm, not greater than 500 µm, not greater than 400 µm, not greater than 300 µm, not greater than 200 µm, not greater than 150 µm, not greater than 130 µm, or not greater than 100 µm. The thickness of the polymer film can have a value between any of the maximum and minimum values noted above, such as from 5 µm to 700 µm, from 10 µm to 500 µm, or from 5 µm to 130 µm.

In another particular embodiment, the polymer film 109 of the building board of the present disclosure may be substantially free of fibers.

The polymer film 109 may further contain perforations in order to allow enhanced drying of the gypsum core. In embodiments, the perforations can be openings of a size of at least 1 µm, such as at least 5 µm, at least 10 µm, at least 20 µm, at least 50 µm, at least 100 µm, at least 200 µm, or at least 300 µm. In other embodiment, the perforations can have openings of not greater than 1.5 mm, such as not greater than 1.0 mm, or not greater than 0.8 mm. The size of the perforations can have a value between any of the minimum and maximum values noted above, such as from 1 µm to 1.5 mm, from 20 µm to 1.0 mm or from 50 µm to 700 µm.

The polymer film 109 of the present disclosure can have a very smooth surface and may be easily paintable. The polymer film 109 can have an average surface roughness of less than 20 µm, such as less than 15 µm, less than 12 µm, less than 10 µm, or less than 9 µm.

The coating layer 110 of the building board composite of the present disclosure may be a thermoplastic coating layer. In particular aspects, the thermoplastic coating layer may be not water vapor permeable. As used herein, not water vapor permeable is intended to mean a water vapor permeability of not greater than 1 perm, measured according to ASTM E96-13 at 21° C.

The coating layer 110 can have a thickness Tc of at least 25 µm, such as at least 30 µm, at least 50 µm, or at least 100 µm. In other embodiments, the thickness of the thermoplastic coating layer may be not greater than 2000 µm, such as not greater than 1500 µm, not greater than 1000 µm, not greater than 500 µm, not greater than 260 µm or not greater than 200 µm. The thickness of the thermoplastic coating layer can have a value between any of the minimum and maximum values noted above, such as from 25 µm to 2000 µm, from 30 µm to 260 µm, or from 50 µm to 200 µm.

The thermoplastic coating layer 110 may contain at least one thermoplastic polymer. In certain embodiments, the at least one thermoplastic polymer can be an ethylene vinyl acetate copolymer, a polyolefin, an ethylene methacrylate (EMA) copolymer, an ethylene acrylic acid copolymer (EAA), a styrene block copolymer, a polyurethane, a polyamide, or any combination thereof.

In certain embodiments, the amount of the thermoplastic polymer in the coating can be at least 10 wt %, such as at least 20 wt %, or at least 30 wt %. In other embodiments, the amount of thermoplastic polymer may be not greater than 70 wt %, such as not greater than 60 wt %, not greater than 50 wt %, or not greater than 45 wt % based on the total weight of the coating. The amount of thermoplastic polymer in the coating layer can have a value between any of the minimum and maximum values noted above, such as from 10 wt % to 70 wt %, from 15 wt % to 65 wt %, or from 20 wt % to 55 wt %.

In a particular embodiment, the thermoplastic coating layer 110 can be a hot-melt coating.

The thermoplastic coating layer 110 of the present disclosure may further contain at least one wax and/or at least one tackifying resin.

Non-limiting examples of suitable waxes can be polar and non-polar polyethylene (PE) waxes, polypropylene waxes (PP), metallocene PE or PP waxes, maleic anhydride grafted PE or PP waxes, Montan waxes, silane-modified PE wax, amide waxes, ester waxes, or PE/PTFE waxes, or any combination thereof.

The wax may be present in the thermoplastic coating layer in an amount of at least 5 wt %, such as at least 7 wt %, at least 10 wt %, or at least 15 wt % based on the total weight of the coating layer. In other aspects, the amount of wax in the coating layer may be not greater than 40 wt %, such as not greater than 35 wt %, not greater than 30 wt %. The amount of wax in the coating layer can have a value between any of the maximum and minimum values noted above, such as from 5 wt % to 40 wt %, from 8 wt % to 35 wt % or from 20 wt % to 30 wt % based on the total weight of the coating layer.

With regard to the tackifying resins that may be present in the thermoplastic coating layer 110, non-limiting examples of tackifying resins can be aliphatic resins, such as mixed monomers of petroleum origin, aromatic resins, such as mixtures of petroleum derived feed streams, pure monomer resins, hydrogenated pure monomer resins, or hydrogenated aliphatic resins.

In embodiments, the amount of tackifying resin in the thermoplastic coating layer 110 can be at least 10 wt %, such as at least 15 wt %, at least 20 wt %, or at least 25 wt % based on the total weight of the coating layer. In other embodiments, the amount of tackifying resin may be not greater than 50 wt %, such as not greater than 45 wt %, not greater than 40 wt %, or not greater than 35 wt %. The amount of tackifying resin in the coating layer can have a value between any of the maximum and minimum values noted above, such as from 10 wt % to 50 wt %, from 15 wt % to 45 wt %, or from 20 wt % to 40 wt % based on the total weight of the coating layer.

In a particular embodiments the thermoplastic coating layer 110 may further include a UV absorber, a filler, a dye, a dispersant or any combination thereof.

In a certain embodiment, the coating layer 110 can be a one-layer coating in direct contact with the polymer film 109. In further particular embodiments, the thermoplastic coating layer may be also a multi-layer coating, for examples, a two-layer coating or a three-layer coating.

The thermoplastic coating layer 110 can include at least one thermoplastic polymer in an amount of 20 wt % to 60 wt % based on the total weight of the coating layer, a wax in an amount of 5 wt % to 40 wt % based on the total weight of the coating layer, a tackifying resin in an amount of 15 wt % to 50 wt %; optionally, the coating layer may further include a UV absorbent in an amount of 0.1 wt % to 3 wt % based on the total weight of the coating layer.

The present disclosure is further directed to a method for making the above-described building board composite.

In one embodiment, the method can comprise providing a polymer film 109 and attaching the polymer film with an adhesive 108 onto a first surface 102 of a first fiber-mat 101. In a particular embodiment, the polymer film 109, the adhesive 108, and the first fiber-mat 101 may be laminated together by co-extrusion. Thereafter, a cementitious layer 107 may be applied on top of a second surface 103 of the first fiber-mat 101, the second surface being opposite to the first surface 102 of the first fiber-mat. The cementitious layer 107 can be covered with a second fiber mat 104, wherein a first surface 105 of the second fiber mat 104 may face the cementitious layer 107, thereby producing a fiber-mat sandwiched cementitious layer composite.

In one embodiment, the polymer film may be perforated, for example, by placing the polymer film on a structured belt.

After drying the fiber-mat sandwiched cementitious layer composite at elevated temperatures (up to 120° C. outer surface temperature of the composite), a coating layer 110 may be applied on the outer surface of the polymer film 109. In certain embodiments, the coating layer 110 may be a thermoplastic coating layer which is water vapor impermeable, and in other certain embodiments, the coating layer 110 may be a water vapor permeable polymeric coating. As used herein, a water vapor impermeable layer is intended to mean a coating layer having a water vapor permeability of not greater than 1 perm, while a water vapor permeable coating layer is intended to mean having a water vapor permeability of at least 10 perms.

The polymer film 109 may be an extruded polymer film including a material selected from a polyester, a polyethylene, a polypropylene, a polyamide, a polyamide imide or any combination thereof. In a particular embodiment, the polymer film 109 may consist essentially of polyethylene terephthalate.

In other particular embodiments of the method of the present disclosure, the applied coating layer 110 may be a thermoplastic coating layer.

The coating layer 110 may be adapted to solidify during a short time after application on the polymer film 109. In aspects, the coating layer 110 may solidify in less than 45 seconds, such as less than 30 seconds, less than 20 seconds, less than 15 seconds, less than 10 seconds, or less than 5 seconds.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A building board, comprising:
a cementitious layer sandwiched between a first fiber mat and a second fiber mat; an extruded polymer film overlying the first fiber mat and/or the second fiber mat, the extruded polymer film having a thickness in a range of at least 5 μm and not greater than 130 μm; and
a thermoplastic coating layer directly overlying the extruded polymer film, the thermoplastic coating layer having a thickness in a range of at least 30 μm and not greater than 260 μm,
wherein the building board passes fastener sealability testing according to a modified ASTM D1970-15, the fastener sealability testing employing a fastener being 635 μm (20 mil) overdriven in the building board for a period of three days at 22° C.

Embodiment 2

The building board of embodiment 1, wherein the extruded polymer film has a thickness Tp, and the thermoplastic coating layer has a thickness Tc, wherein a ratio of Tp to Tc is at least 1:1 and not greater than 1:50, such as at least 1:1 and not greater than 1:30, at least 1:1 and not greater than 1:20, or 1:1 and not greater than 1:10.

Embodiment 3

The building board of embodiments 1 or 2, wherein the polymer film has a Young's modulus of at least 1500 MPa and not greater than 3500 MPa.

Embodiment 4

The building board according to any one of the previous embodiments, wherein the extruded polymer film has a tensile strength of at least 30 MPa and not greater than 110 MPa.

Embodiment 5

The building board of any one of the previous embodiments, wherein the first and/or the second fiber mat comprise mineral fibers, polymer fibers or a combination thereof.

Embodiment 6

The building board of any one of the previous embodiments, wherein the first and/or the second mat comprise glass fibers.

Embodiment 7

The building board of any one of the previous embodiments, wherein the cementitious layer includes at least one cementitious material selected from gypsum, Portland cement, magnesium oxide, magnesium phosphate, or any combination thereof.

Embodiment 8

The building board according to any one of the previous embodiments, further comprising an adhesive layer between the polymer film and the first fiber mat and/or second fiber mat.

Embodiment 9

The building board according to any one of the previous embodiments, wherein the thickness Tp of the extruded polymer film is at least 10 microns, such as at least 15 microns, at least 20 microns, at least 30 microns, or at least 50 microns.

Embodiment 10

The building board according to any one of the previous embodiments, wherein the thickness of the extruded polymer film is not greater than 120 microns, such as not greater than 100 microns, or not greater than 80 microns.

Embodiment 11

The building board according to any one of the previous embodiments, wherein the extruded polymer film includes a polyester, a polyethylene, a polypropylene, a polyamide, a polyamide imide or any combination thereof.

Embodiment 12

The building board according to any one of the previous embodiments, wherein the extruded polymer film consists essentially of a polyester.

Embodiment 13

The building board according to any one of the previous embodiments, wherein the polymer film includes a polyethylene terephthalate, a polypropylene terephthalate, a polybutylene terephthalate, or any combination thereof.

Embodiment 14

The building board according to any one of the previous embodiments, wherein the polymer film consists essentially of polyethylene terephthalate.

Embodiment 15

The building board according to any one of the previous embodiments, wherein the polymer film consists essentially of bi-axially stretched polyethylene terephthalate.

Embodiment 16

The building board according to any one of the previous embodiments, wherein the polymer film comprises perforations.

Embodiment 17

The building board according to embodiment 16, wherein the perforations have openings of a size of at least 1 micron, such as at least 5 microns, at least 10 microns, at least 20 microns, at least 50 microns, at least 100 microns, at least 200 microns, or at least 500 microns.

Embodiment 18

The building board according to embodiment 16, wherein the perforations have openings of a size of not greater than 5 mm, not greater than 3 mm, not greater than 2 mm, not greater than 1.5 mm, or not greater than 1 mm.

Embodiment 19

The building board according to any one of the previous embodiments, wherein the thermoplastic coating layer comprises a thermoplastic polymer selected from the group consisting of an ethylene vinyl acetate copolymer, a polyolefin, an ethylene methacrylate (EMA) copolymer, an ethylene acrylic acid copolymer (EAA), a styrene block copolymer, a polyurethane, a polyamide, and any combination thereof.

Embodiment 20

The building board according to embodiment 19, wherein an amount of the at least one thermoplastic polymer is at least 10 wt %, such as at least 20 wt %, or at least 30 wt % based on the total weight of the coating layer.

Embodiment 21

The building board according to embodiment 19, wherein an amount of the at least one thermoplastic polymer is not greater than 70 wt %, such as not greater than 60 wt %, not greater than 50 wt %, or not greater than 45 wt % based on the total weight of the coating layer.

Embodiment 22

The building board according to any one of the preceding embodiments, wherein the thermoplastic coating layer further comprises a wax and a tackifying resin.

Embodiment 23

The building board according to embodiment 22, wherein the wax of the thermoplastic coating layer is present in an amount of at least 5 wt %, such as at least 7 wt %, or at least 10 wt % based on the total weight of the thermoplastic coating layer.

Embodiment 24

The building board according to embodiment 22, wherein the wax of the thermoplastic coating layer is present in an amount of not greater than 40 wt %, such as not greater than 35 wt %, not greater than 30 wt %, or not greater than 25 wt % based on the total weight of the coating layer.

Embodiment 25

The building board according to any one of embodiments 22 to 24, wherein the tackifying resin of the thermoplastic coating layer is present in an amount of at least 15 wt %, such as at least 20 wt %, or at least 25 wt % based on the total weight of the coating layer.

Embodiment 26

The building board according to any one of embodiments 22 to 27, wherein the tackifying resin of the thermoplastic coating layer is present in an amount of not greater than 50 wt %, such as not greater than 45 wt %, or not greater than 40 wt % based on the total weight of the coating layer.

Embodiment 27

The building board according to any one of the previous embodiments, wherein the thermoplastic coating is a hot-melt coating.

Embodiment 28

The building board according to any one of the previous embodiments, wherein the thermoplastic coating layer has a thickness of at least 50 microns, such as at least 70 microns, or at least 100 microns.

Embodiment 29

The building board according to any one of the previous embodiments, wherein the thermoplastic coating layer has a thickness of not greater than 250 microns, such as not greater than 200 microns, or not greater than 150 microns.

Embodiment 30

The building board according to any one of the previous embodiments, wherein the thermoplastic coating layer has a Shore D hardness of at least 30, such as at least 35, or at least 40.

Embodiment 31

The building board according to any one of the previous embodiments, wherein the thermoplastic coating layer has a Shore D hardness of not greater than 60, such as not greater than 55, or not greater than 50.

Embodiment 32

The building board according to any one of the previous embodiments, wherein the thermoplastic coating layer has a water vapor permeability of not greater than 1 perm.

Embodiment 33

The building board according to any one of the previous embodiments, wherein the thermoplastic polymeric coating layer solidifies in less than 45 seconds, such as less than 30 seconds, less than 20 seconds, less than 15 seconds, less than 10 seconds, or less than 5 seconds.

Embodiment 34

A method for manufacturing a building board, comprising: providing an extruded polymer film having a thickness in a range of at least 5 μm and not greater than 130 μm and attaching the polymer film with an adhesive onto a first surface of a first fiber-mat;
applying a cementitious layer on top of a second surface of the first fiber-mat, the second surface being opposite to the first surface of the first fiber-mat;
applying a second fiber mat on top of the cementitious layer to obtain a fiber-mat sandwiched cementitious layer composite;
drying the fiber-mat sandwiched cementitious layer composite; and applying a thermoplastic polymeric coating layer onto an outer surface of the extruded polymer film,
wherein the building board passes fastener sealability testing according to a modified ASTM D1970-15, the modified testing comprising employing a fastener being 635 μm (20 mil) overdriven in the building board for a period of 3 days at 22° C.

Embodiment 35

The method according to embodiment 34, wherein the extruded polymer layer has a thickness Tp and the thermoplastic coating layer has a thickness Tc, wherein a ratio of Tp to Tc is at least 1:1 and not greater than 1:50, such as at least 1:1 and not greater than 1:30, at least 1:1 and not greater than 1:20, or 1:1 and not greater than 1:10.

Embodiment 36

The method according to embodiments 34 or 35, wherein the polymer film has a Young's modulus of at least 1500 MPa and not greater than 3500 MPa.

Embodiment 37

The method according to any one of embodiments 34 to 36, wherein the polymer film has a tensile strength of at least 30 MPa and not greater than 110 MPa.

Embodiment 38

The method according to any one of embodiments 34 to 37, wherein the first and/or second fiber mat comprise mineral fibers, polymer fibers or a combination thereof.

Embodiment 39

The method according to any one of embodiments 34 to 38, wherein the first and/or second mat comprise glass fibers.

Embodiment 40

The method according to any one of embodiments 34 to 39, wherein the cementitious layer includes gypsum, Portland cement, magnesium oxide, magnesium phosphate, or any combination thereof.

Embodiment 41

The method according to any one of embodiments 34 to 40, wherein the thickness of the extruded polymer film is at least 10 microns, such as at least 15 microns, at least 20 microns, at least 30 microns, or at least 50 microns.

Embodiment 42

The method according to any one of embodiments 34 to 41, wherein the thickness of the extruded polymer film is not greater than 120 microns, such as not greater than 100 microns, or not greater than 80 microns.

Embodiment 43

The method according to any one of embodiments 34 to 42, wherein the extruded polymer film includes a polyester, a polyethylene, a polypropylene, a polyamide, a polyamide imide or any combination thereof.

Embodiment 44

The method according to any one of embodiments 34 to 43, wherein the extruded polymer film consists essentially of a polyester.

Embodiment 45

The method according to any one of embodiments 34 to 44, wherein the extruded polymer film includes a polyethylene terephthalate, a polypropylene terephthalate, a polybutylene terephthalate, or any combination thereof.

Embodiment 46

The method according to any one of embodiments 34 to 45, wherein the extruded polymer film consists essentially of polyethylene terephthalate.

Embodiment 47

The method according to any one of embodiments 34 to 46, wherein the extruded polymer film consists essentially of bi-axially stretched polyethylene terephthalate.

Embodiment 48

The method according to any one of embodiments 34 to 47, wherein the extruded polymer film comprises perforations.

Embodiment 49

The method according to embodiment 48, wherein the perforations have openings of a size of at least 1 micron, such as at least 5 microns, at least 10 microns, at least 20 microns, at least 50 microns, at least 100 microns, at least 200 microns, or at least 500 microns.

Embodiment 50

The method according to embodiment 48, wherein the perforations have openings of a size of not greater than 5 mm, not greater than 3 mm, not greater than 2 mm, not greater than 1.5 mm, or not greater than 1 mm.

Embodiment 51

The method according to any one of embodiments 34 to 59, wherein the thermoplastic coating layer comprises at least one thermoplastic polymer selected from a group consisting of an ethylene vinyl acetate copolymer, a polyolefin, an ethylene methacrylate (EMA) copolymer, an ethylene acrylic acid copolymer (EAA), a styrene block copolymer, a polyurethane, a polyamide, and any combination thereof.

Embodiment 52

The method according to any one of embodiments 34 to 51, wherein an amount of the at least one thermoplastic polymer is at least 10 wt %, such as at least 20 wt %, or at least 30 wt % based on the total weight of the coating layer.

Embodiment 53

The method according to any one of embodiments 34 to 52, wherein an amount of the at least one thermoplastic polymer is not greater than 70 wt %, such as not greater than 60 wt %, not greater than 50 wt %, or not greater than 45 wt % based on the total weight of the coating layer.

Embodiment 54

The method according to any one of embodiments 34 to 53, wherein the thermoplastic coating layer further comprises a wax and a tackifying resin.

Embodiment 55

The method according to embodiment 54, wherein the wax of the thermoplastic coating layer is present in an amount of at least 5 wt %, such as at least 7 wt %, or at least 10 wt % based on the total weight of the thermoplastic coating layer.

Embodiment 56

The method according to embodiment 54, wherein the wax of the thermoplastic coating layer is present in an amount of not greater than 40 wt %, such as not greater than 35 wt %, not greater than 30 wt %, or not greater than 25 wt % based on the total weight of the coating layer.

Embodiment 57

The method according to any one of embodiments 54 to 56, wherein the tackifying resin of the thermoplastic coating layer is present in an amount of at least 15 wt %, such as at least 20 wt %, or at least 25 wt % based on the total weight of the coating layer.

Embodiment 58

The method according to any one of embodiments 54 to 57, wherein the tackifying resin of the thermoplastic coating layer is present in an amount of not greater than 50 wt %, such as not greater than 45 wt %, or not greater than 40 wt % based on the total weight of the coating layer.

Embodiment 59

The method according to any one of embodiments 34 to 58, wherein the thermoplastic coating is a hot-melt coating.

Embodiment 60

The method according to any of one of embodiments 34 to 59, wherein the thermoplastic coating layer has a thickness of at least 50 microns, such as at least 70 microns, or at least 100 microns.

Embodiment 61

The method according to any of one of embodiments 34 to 60, wherein the thermoplastic coating layer has a thickness of not greater than 250 microns, such as not greater than 200 microns, or not greater than 150 microns.

Embodiment 62

The method according to any of one of embodiments 34 to 61, wherein the thermoplastic coating layer has a Shore D hardness of at least 30, such as at least 35, or at least 40.

Embodiment 63

The method according to any of one of embodiments 34 to 62, wherein the thermoplastic coating layer has a Shore D hardness of not greater than 60, such as not greater than 55, or not greater than 50.

Embodiment 64

The method according to any of one of embodiments 34 to 63, wherein the thermoplastic coating layer has a water vapor permeability of not greater than 1 perm.

Embodiment 65

The method according to any of one of embodiments 34 to 64, wherein the thermoplastic polymeric coating layer solidifies in less than 45 seconds, such as less than 30 seconds, less than 20 seconds, less than 15 seconds, less than 10 seconds, or less than 5 seconds.

EXAMPLES

The following non-limiting examples illustrate the present invention.

Example 1

Pre-testings were conducted with three different types of hot-melt from HB Fuller (HL-9184; HL-7248; and HL-82512) to compare the suitability of the hot-melt coatings applied on extruded PET film for the building boards of the present disclosure.

Table 1 shows a summary of measured properties of the coatings, specifically hardness (Shore D), observed elasticity, strength and strain. The stress/strain testing was conducted according to ASTM D638-2000.

TABLE 1

| Hot-melt coating | Hardness (Shore D) | Elasticity | Tensile Strength [psi] | Strain [%] |
|---|---|---|---|---|
| HL-9184 | 51 | Very brittle, low elasticity, difficult to create a film | 923 | 12 |
| HL-7248 | 42 | More elastic than HL-9184 | 496 | 587 |
| HL-82512 | 27 | Most elastic | 127 | 175 |

According to the pre-testing of the above-described three hot-melt coatings, it was concluded that a hardness range (Shore D) for the outer coating layer 110 of the building board of the present disclosure can be between 30 and 60, particularly between 40 and 50.

Suitable thickness ranges of the PET film and the hot-melt coating were evaluated for the manufacturing of building boards with a high fastener sealing capability. For the PET film, a thickness in the range of 6.35 μm to 635 μm (0.25 mils to 25 mils) was considered as acceptable, while the thickness of the hot-melt coating can be in the range of 25.4 μm to 508 μm (1 mil to 20 mils), particularly 127 μm to 254 μm (5 to 10 mils).

Depending on the elasticity and strength of the hot-melt coating, different sealing capabilities of the boards were observed. In case of a very hard and brittle hot-melt coating (Sample FH 9184), a 10 to 20 mils (254 microns to 508 microns) overdriven screw led to minor water penetration, while a more elastic hot-melt coating (FH 7248), even with a 1778 μm (70 mils) overdriven screw did not show any detectable water penetration. If the hot-melt coating was too elastic (FH 82512), however, the coating became very sticky and the board was impractical to handle.

Example 2

Testing of Fastener Sealability of Thin PET Film and Thin Hot-Melt Coating

Table 2 summarizes fastener sealability tests of overdriven fasteners on gypsum boards, wherein the gypsum boards contained a thin 12.2 μm (0.48 mils) thick PET film covered by a thin hot-melt coating HL-7248 with varying coatings thickness of 152.4 μm to 381 μm (6 mils to 15 mils), see samples E1, E2, and E3. In comparison, a commercial gypsum board was tested for fastener sealability, see sample C1 (Diamondback), which contained only a thin hot-melt coating of 152.4 μm (6 mils) and no PET film underneath the hot-melt coating.

A 152.4 μm (6 mil) thick hot-melt coating alone was not able to seal overdriven fasteners (see C1), while the combination of a 12.2 μm (0.48 mils) thick PET film and a 6 mil hot-melt coating could sufficiently protect the gypsum board when fasteners with an overdrive of at least 508 μm (20 mils) were screwed through the boards.

TABLE 2

| Sample No. | Gypsum board protection | PET thickness [mils] | Hot-melt coating thickness [mils] | Fastener overdrive [mils] | Maximum fastener overdrive [mils] |
|---|---|---|---|---|---|
| E1 | PET/HL-7248 | 0.48 | 6 | 25 passed | 30 passed |
| E2 | PET/HL-7248 | 0.48 | 10 | 20 passed | 30 passed |
| E3 | PET/HL-7248 | 0.48 | 15 | 35 passed | 40 passed |
| C1 | HL-9184 only | — | 6 | 20 failed | NA |

Further tests were conducted on samples E1, E2, and E3, testing the maximum possible overdrive, until no detectable water leakage could be observed, see also Table 2, last column. While samples E2 and E3 with 152.4 μm (6 mils) and 254 μm (10 mils) thick hot-melt coatings on PET allowed a fastener overdrive of 4351 μm (30 mils), a 2175 μm (15 mils) hot-melt coating on PET even allowed a 5801 μm (40 mils) fastener overdrive.

The results of the tested gypsum boards comprising the combination of a thin PET film and a thin hot-melt coating demonstrate that it is possible to obtain fastener sealability of overdriven fasteners even with hot-melt coatings having a thickness of only 152.4 μm (6 mils) if combined with an underlying thin PET film of 12.2 μm (0.48 mils). A single hot-melt coating of 152.4 μm (6 mils) thickness did not achieve such fastener sealability protection, as show in sample C1.

Figure 3:
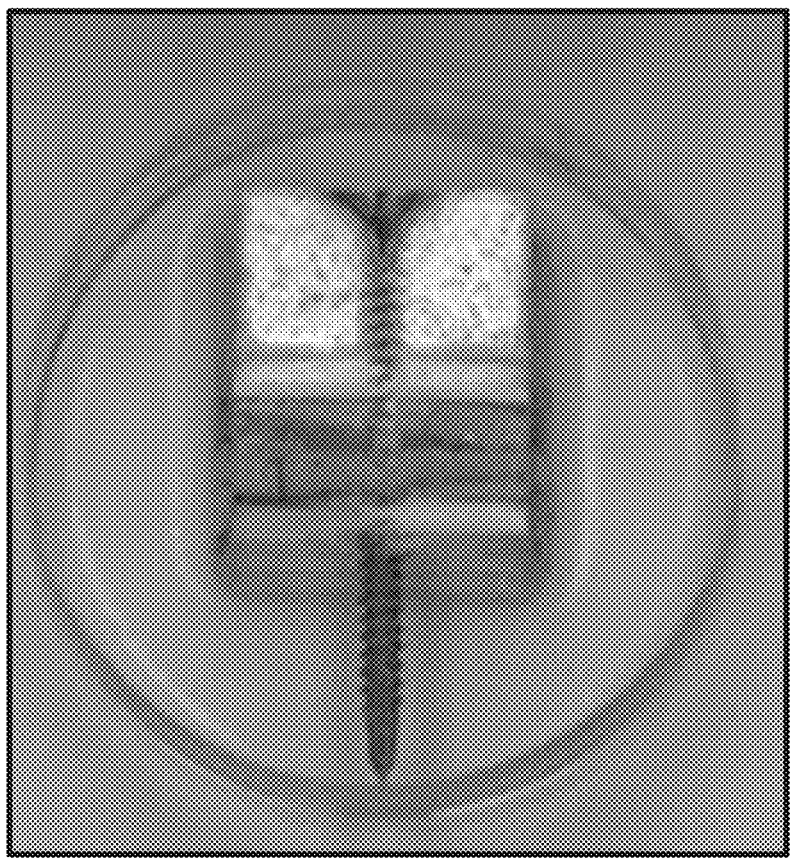
FIG. 3 includes an image of an overdriven screw into a hot-melt coated gypsum board.

FIG. 3 includes an image of an overdriven fastener penetrating a gypsum board.

Measurement of Fastener Sealability

The capability of the building boards as disclosed herein to seal around fasteners was tested according to a modified ASTM method D1970-15. The modification in comparison to ASTM D1970-15 included that the fasteners were not galvanized roofing nails but self drill drywall screws #6 with Phillips Head, having a 4.13 cm length. The gypsum boards with the size of one square foot were fixed on a metallic rail with 2 screws in a distance of 2 inches (5.1 cm) from each other. Further differences to ASTM D1970-15 were that the fasteners were not remained flush with the outer surface of the board, but overdriven with varying depths into the boards, and the testing period of three days was not conducted in a refrigeration unit at 5° C., but at 22° C. (room temperature).

As acceptance criteria for passing the fastener sealing test was a maximum water uptake of 0.35 wt % of the board. This amount of water uptake corresponds to a maximum loss of 25% in the screw pull resistance.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A building board, comprising:
a cementitious layer sandwiched between a first fiber mat and a second fiber mat, the first fiber mat and the second fiber mat being directly embedded in the cementitious layer;
a bi-axially stretched extruded polymer film overlying the first fiber mat and/or the second fiber mat, the extruded polymer film having a thickness in a range of at least 5 microns and not greater than 130 microns and consisting essentially of polyethylene terephthalate;
a thermoplastic coating layer directly overlying the extruded polymer film, the thermoplastic coating layer having a thickness in a range of at least 30 microns and not greater than 260 microns, and the thermoplastic coating layer has a Shore D hardness of at least 30; and
an adhesive layer between the polymer film and the first fiber mat and/or the second fiber mat, the adhesive layer directly attaching the polymer film to the first fiber mat and/or second fiber mat,
wherein the extruded biaxially stretched polymer film consisting essentially of polyethylene terephthalate has a thickness Tp and the thermoplastic coating layer has a thickness Tc, and a ratio of Tp to Tc is between 1:10 and 1:20, and
the building board is adapted for using fasteners for installation and passes fastener sealability testing according to a modified ASTM D1970 by having a water uptake of not greater than 0.35 wt % of the board, the fastener sealability testing employing a fastener being 635 microns overdriven in the building board for a period of three days, the fastener being a drywall screw #6 having a Phillips Head.

2. The building board according to claim 1, wherein the polymer film has a Young's modulus of at least 1500 MPa and not greater than 3500 MPa.

3. The building board according to claim 1, wherein the extruded polymer film has a tensile strength of at least 30 MPa and not greater than 110 MPa.

4. The building board according to claim 1, wherein the thermoplastic coating layer has a Shore D hardness of at least 30 and not greater than 60.

5. The building board according to claim 1, wherein the first fiber mat and/or the second fiber mat comprise glass fibers.

6. The building board according to claim 1, wherein the cementitious layer includes at least one cementitious material selected from gypsum, Portland cement, magnesium oxide, magnesium phosphate, or any combination thereof.

7. The building board according to claim 1, wherein the thickness of the extruded polymer film is at least 10 microns and not greater than 100 microns.

8. The building board according to claim 1, wherein the polymer film comprises perforations having openings of a size of at least 10 μm and not greater than 1 mm.

9. The building board according to claim 1, wherein the thermoplastic coating layer comprises a thermoplastic polymer selected from the group consisting essentially of an ethylene vinyl acetate copolymer, a polyolefin, an ethylene methacrylate (EMA) copolymer, an ethylene acrylic acid copolymer (EAA), a styrene block copolymer, a polyurethane, a polyamide, or any combination thereof.

10. The building board according to claim 9, wherein an amount of the thermoplastic polymer is at least 10 wt % and not greater than 70 wt %.

11. The building board according to claim 1, wherein the thermoplastic coating layer further comprises a wax in an amount of at least 5 wt % and a tackifying resin in an amount of at least 15 wt %.

12. The building board according to claim 1, wherein the thermoplastic coating is a hot-melt coating.

13. The building board according to claim 1, wherein the thermoplastic polymeric coating layer solidifies in less than 45 seconds.

14. The building board of claim 1, wherein the thermoplastic coating layer has a water vapor permeability of not greater than 1 perm measured according to ASTM E96-13 at 21° C.

15. A method for manufacturing a building board, comprising:
providing an extruded bi-axially stretched polyethylene terephthalate film having a thickness in a range of at least 5 microns and not greater than 130 microns and attaching the extruded bi-axially stretched polyethylene terephthalate film with an adhesive layer onto a first surface of a first fiber mat, the adhesive layer directly attaching the extruded bi-axially stretched polyethylene terephthalate film to the first fiber mat;
applying a cementitious layer on top of a second surface of the first fiber mat, the second surface being opposite to the first surface of the first fiber mat, the first fiber mat being directly embedded in the cementitious layer;
applying a second fiber mat on top of the cementitious layer to obtain a fiber mat sandwiched cementitious layer composite, the second fiber mat being directly embedded in the cementitious layer;
drying the fiber mat sandwiched cementitious layer composite; and
applying a thermoplastic coating layer onto an outer surface of the extruded bi-axially stretched polyethylene terephthalate film, the thermoplastic coating layer having a thickness in a range of at least 30 microns and not greater than 260 microns,
wherein the extruded bi-axially stretched polyethylene terephthalate film has a thickness Tp and the thermoplastic coating layer has a thickness Tc, wherein a ratio of Tp to Tc is between 1:10 and 1:20, and
the building board is adapted for using fasteners for installation and passes fastener sealability testing according to a modified ASTM D1970-15 by having a water uptake of not greater than 0.35 wt % of the board, the modified testing comprising employing a fastener being 635 microns overdriven in the building board for a period of 3 days at 22° C., the fastener being a drywall screw #6 having a Phillips Head, and the thermoplastic coating layer has a Shore D hardness of at least 30.

* * * * *